United States Patent
Kato et al.

(10) Patent No.: US 10,393,339 B2
(45) Date of Patent: Aug. 27, 2019

(54) VEHICLE HEAD LAMP

(71) Applicant: Koito Manufacturing Co., Ltd., Tokyo (JP)

(72) Inventors: Shingo Kato, Shizuoka (JP); Daisuke Aizawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 16/115,979

(22) Filed: Aug. 29, 2018

(65) Prior Publication Data

US 2019/0072255 A1 Mar. 7, 2019

(30) Foreign Application Priority Data

Jun. 13, 2018 (JP) .................. 2018-112694

(51) Int. Cl.
| | |
|---|---|
| *F21S 45/33* | (2018.01) |
| *F21S 45/43* | (2018.01) |
| *F21S 45/47* | (2018.01) |
| *F21S 41/151* | (2018.01) |
| *B60Q 1/04* | (2006.01) |
| *F21S 41/143* | (2018.01) |
| *F21S 45/435* | (2018.01) |
| *F21Y 115/10* | (2016.01) |
| *F21S 41/25* | (2018.01) |

(52) U.S. Cl.
CPC .............. *F21S 45/43* (2018.01); *B60Q 1/04* (2013.01); *F21S 41/143* (2018.01); *F21S 41/151* (2018.01); *F21S 45/33* (2018.01); *F21S 45/435* (2018.01); *F21S 45/47* (2018.01); *B60Q 2200/00* (2013.01); *F21S 41/25* (2018.01); *F21Y 2115/10* (2016.08)

(58) Field of Classification Search
CPC .......... F21S 45/43; F21S 45/435; F21S 45/33; F21S 41/143; F21S 41/151; F21S 45/47; F21S 41/25; B60Q 1/04; B60Q 2200/00; F21Y 2115/10
See application file for complete search history.

(56) References Cited

U.S. PATENT DOCUMENTS

| | | | | |
|---|---|---|---|---|
| 2010/0103691 A1* | 4/2010 | Yasuda | ................... | F21V 29/76 362/547 |
| 2014/0022807 A1* | 1/2014 | Watanabe | ................ | B60Q 1/14 362/512 |

FOREIGN PATENT DOCUMENTS

JP 2010-262903 A 11/2010

* cited by examiner

*Primary Examiner* — Donald L Raleigh
(74) *Attorney, Agent, or Firm* — Abelman, Frayne & Schwab

(57) ABSTRACT

Disclosed is a vehicle head lamp includes: a plurality of lamps arranged in parallel with each other and each including a light source that emits light irradiated to a forward and a heat sink that radiates heat generated from the light source; a blower; and a lamp housing configured to accommodate the plurality of lamps and the blower. Each of the plurality of lamps includes a first lamp disposed in a blowing direction where air is blown by the blower, and a second lamp disposed on a flow path of the air flowing through the first lamp. The blower includes an air suction space into which the air flowing through the second lamp is sucked.

10 Claims, 7 Drawing Sheets

VEHICLE HEAD LAMP

CROSS-REFERENCE TO RELATED APPLICATIONS

This application is based on and claims priority from Japanese Patent Application Nos. 2017-170381 and 2018-112694, filed on Sep. 5, 2017, and Jun. 13, 2018, respectively, with the Japan Patent Office, the disclosures of which are incorporated herein in their entireties by reference.

TECHNICAL FIELD

The present disclosure relates to a vehicle head lamp, specifically, to a vehicle head lamp capable of suppressing uneven heat distribution while miniaturizing.

BACKGROUND

It is known that a vehicle head lamp represented by a vehicle headlight includes, besides a low beam light source for illuminating the front at night, for example, a high beam light source for illuminating a distance farther than the low beam, or a daytime running lamp DRL for indicating the presence of a vehicle in daytime. The high beam or the light from the daytime running lamp includes light which is irradiated above the low beam. Therefore, the high beam may illuminate a distance farther than the low beam, and light from the daytime running lamp may be viewed from a position higher than the low beam. Further, there is a vehicle head lamp in which a plurality of lamps are arranged, for example, from the viewpoint of design.

Japanese Patent Laid-Open Publication No. 2010-262903 discloses a vehicle head lamp which includes three LED modules arranged in a left and right direction of the vehicle in a lamp room. The vehicle head lamp disclosed in Japanese Patent Laid-Open Publication No. 2010-262903 has a specific configuration of an LED module portion positioned on the left side among three LED modules. Specifically, the LED module portion includes an LED module serving a light source, a support portion that supports the LED module, and a heat radiating portion that diffuses heat of the LED module are provided. Since the heat radiating portion functions as a heat sink and the heat radiating portion and the support portion are integrally formed, it may be understood that a lamp having a light source and a heat sink is disclosed in the vehicle head lamp of Japanese Patent Laid-Open Publication No. 2010-262903. Further, besides the lamp, an electric fan as a blower is provided in the lamp room of Japanese Patent Laid-Open Publication No. 2010-262903. The electric fan is disposed at the rear end position of the heat radiating portion, and air sent to the heat radiating portion side by the electric fan flows to the LED modules through a duct formed in the heat radiating portion.

SUMMARY

In the vehicle head lamp of Japanese Patent Laid-Open Publication No. 2010-262903, specific configurations of an LED module portion positioned in the middle and an LED module portion positioned on the right side among the three LED modules are not disclosed. In a case where the LED module portion positioned in the middle and the LED module portion positioned on the right side have a configuration in which a lamp and a blower are provided as described above, the blower tends to become larger because the blower is required for each lamp.

Further, in the vehicle head lamp of Japanese Patent Laid-Open Publication No. 2010-262903, air flows at least in the LED module on the left side by the electric fan. Although the air is warmed by the heat of the LED module and flows forward, the heat may be unevenly distributed in the lamp room.

Therefore, the present disclosure is to provide a vehicle head lamp capable of suppressing uneven heat distribution while miniaturizing.

In order to achieve the object of the present disclosure, a vehicle head lamp of the present disclosure includes a plurality of lamps arranged in parallel with each other and each including a light source that emits light irradiated to a forward and a heat sink that radiates heat generated from the light source, a blower, a lamp housing configured to accommodate the plurality of lamps and the blower. Each of the plurality of lamps includes a first lamp disposed in a blowing direction where air is blown by the blower, and a second lamp disposed on a flow path of the air flowing through the first lamp, and the blower includes an air suction space into which the air flowing through the second lamp is sucked.

In such a vehicle head lamp, the air blown to the first lamp by the blower flows through the first lamp to the second lamp, and passes through the second lamp. The air passing through the second lamp is sucked into the air suction space of the blower, and is blown again to the first lamp. In this manner, according to the vehicle head lamp of the present disclosure, it is possible to circulate air in the lamp housing with one blower, and it is possible to suppress uneven heat distribution in the lamp housing by the circulation of the air. In this way, it is possible to suppress uneven heat distribution while miniaturizing.

Further, the blower may include a rectifying unit configured to guide air introduced into the air suction space in the blowing direction.

In this case, circulation of the air inside the lamp housing may be promoted as compared with a case where the air introduced into the air suction space is not guided in the blowing direction. Therefore, the uneven heat distribution in the lamp housing may be further suppressed.

Further, the lamp housing includes a housing body having an opening in front, and a front cover attached to the housing body so as to close the opening. The blower may be fixed to the housing body.

The lamp may include a mechanism for adjusting an aiming of light emitted from the light source. However, when the blower is fixed to such a lamp, the wind direction of the blower may be changed due to adjustment of the aiming. With regard to this, when the blower is fixed to the housing body, a relative position between the lamp housing and the blower is constant. Therefore, irrespective of whether the lamp includes a mechanism for adjusting the aiming, the blowing direction of the blower is constant so that circulation of the air in the lamp housing may be kept constantly.

Further, the blower includes an impeller, a support frame configured to support the impeller, and a leg portion fixed to the housing body and connected to the support frame. The air suction space may be formed by the leg portion and the housing body.

In this case, even when the shape of the housing body is changed, it is easy to fix the blower to the housing body while forming the air suction space in the housing body, so that the versatility may be improved.

Further, a breathing hole may be provided at a rear position of the blower in the housing body.

In this case, outside air is sucked into the lamp housing from the breathing hole by the blower, and the outside air may be circulated in the lamp housing. Therefore, the cooling effect inside the lamp housing may be enhanced as compared with a case where only the air inside the lamp housing is circulated in the lamp housing.

Further, a part of the heat sink of the second lamp may be positioned behind a surface of the blower that is closest to the first lamp and in parallel with a left-right direction of a vehicle.

In this case, the second lamp is close to the blower as compared with a case where a part of the heat sink in the second lamp is positioned on the front side of the surface. Therefore, the blower is able to suck more air flowing through the second lamp, from the air suction space. Accordingly, circulation of air inside the lamp housing may be promoted.

As described above, according to the present disclosure, is it possible to provide a vehicle head lamp capable of suppressing uneven heat distribution while miniaturizing.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

First, a configuration of a lamp of the present embodiment will be described.

Figure 1:
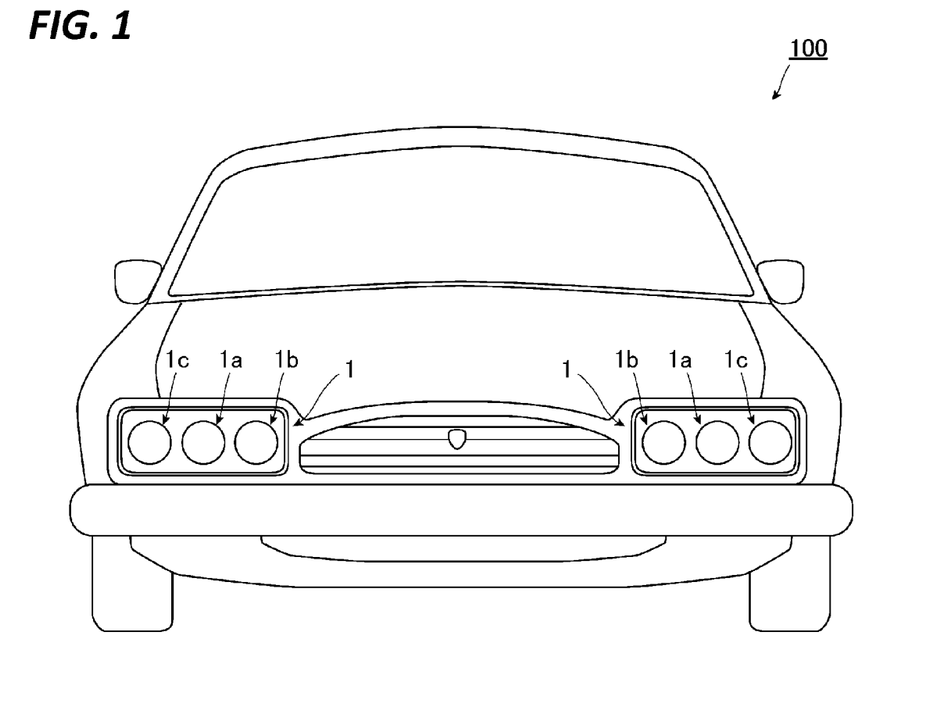
FIG. 1 is a front view schematically illustrating a vehicle provided with a vehicle head lamp according to an embodiment of the present disclosure.

FIG. 1 is a front view schematically illustrating a vehicle provided with a vehicle head lamp according to the embodiment. As illustrated in FIG. 1, a vehicle 100 is provided with a pair of vehicle head lamps 1 in the front in the left-right direction. That is, the vehicle head lamps 1 are disposed outside the center of the vehicle 100 in the left-right direction. Further, the pair of vehicle head lamps 1 provided to the vehicle 100 is symmetrical in the left-right direction with respect to each other. The vehicle head lamps 1 of the embodiment includes a plurality of lamps 1a, 1b, and 1c arranged in the left-right direction. The lamp 1c is disposed the outermost side of the vehicle 100, the lamp 1b is disposed in the most center side of the vehicle 100, and the lamp 1a is disposed between the lamp 1b and the lamp 1c.

Figure 2:
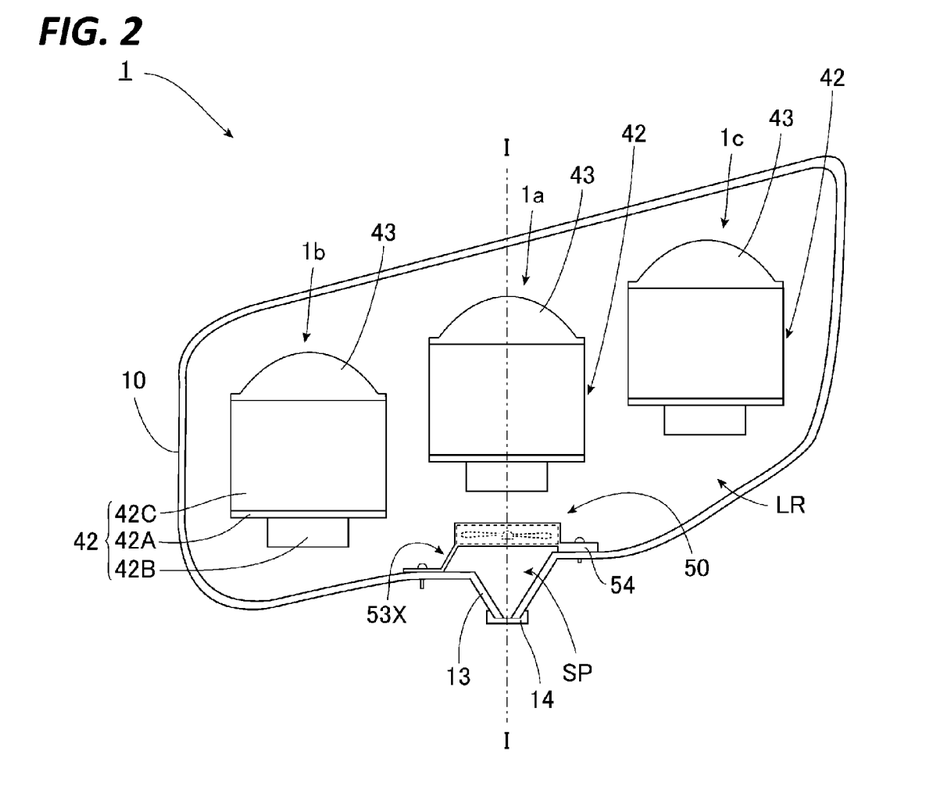
FIG. 2 is an enlarged conceptual view of the vehicle head lamp of FIG. 1.

FIG. 2 is an enlarged conceptual view of the vehicle head lamp 1 of FIG. 1. As illustrated in FIG. 2, the vehicle head lamp 1 includes the plurality of lamps 1a to 1c, a lamp housing 10, and a blower 50. The plurality of lamps 1a to 1c and the blower 50 are accommodated in the lamp housing 10. FIG. 2 illustrates the vehicle head lamp 1 on the right side of the vehicle 100. The right side of the vehicle 100 is the left side of the paper in FIG. 1 and the right side of the drawing in FIG. 2. In the vehicle head lamp 1 illustrated in FIG. 2, the three lamps 1a to 1c arranged in the left-right direction are disposed diagonally in a direction from the right-front to the left-rear of the vehicle 100. In the vehicle head lamp 1 on the left side, although not illustrated, the three lamps 1a to 1c arranged in the left-right direction are disposed diagonally in a direction from the left-front to the right-rear of the vehicle 100.

Figure 3:
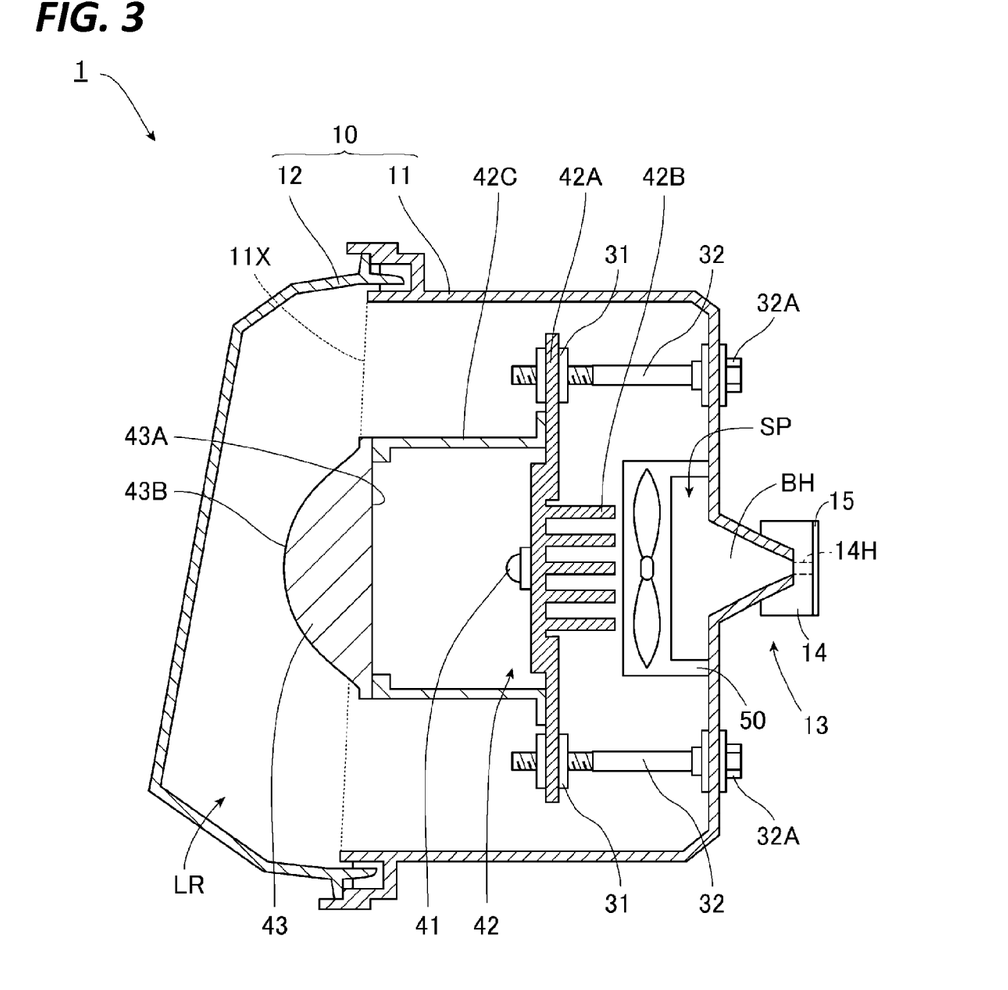
FIG. 3 is a cross-sectional view taken along the line I-I of FIG. 2.

FIG. 3 is a cross-sectional view taken along the line I-I of FIG. 2. As illustrated in FIG. 3, the lamp housing 10 is provided with a housing body 11 and a front cover 12 as main components. An opening 11X is provided at the front of the housing body 11, and the front cover 12 is attached to the housing body 11 to close the opening 11X. The front cover 12 is detachable with respect to the housing body 11.

A breathing hole BH is provided to a rear wall of the housing body 11. The breathing hole BH is a hole for taking in and out the air outside and inside the lamp housing 10. In the embodiment, the breathing hole BH is located behind the blower 50. Further, in the embodiment, the wall portion of the rear wall of the housing body 11 where the breathing hole BH is provided is formed as a tubular breathing portion 13. The breathing portion 13 has a tubular shape protruding rearward than other portion of the rear wall of the housing body 11 other than the breathing portion 13. A part of side wall in the tubular breathing portion 13 is inclined so as to be tapered rearward from an opening of a lamp room LR. Therefore, a cross-sectional area of the breathing hole BH which is the inner hollow of the breathing portion 13 decreases from the opening of the lamp room LR side toward the rear. A cap 14 is attached to an opening on an opposite side to the opening on the lamp room LR side in the breathing portion 13 so as to close the opening on the opposite side. The breathing hole BH communicates with the outside through a through hole 14H provided in the cap 14. An outside opening in the through hole 14H in the cap 14 is covered with a coating film 15 which is gas permeable and waterproof.

The lamp room LR is a space formed by the housing body 11 and the front cover 12 that closes the front opening of the housing body 11. The plurality of lamps 1a to 1c and the blower 50 are disposed in the lamp room LR.

The plurality of lamps 1a to 1c are mechanisms that irradiate light to the front, and have the same configuration in the embodiment. Therefore, the configuration of the plurality of lamps 1a to 1c will be mainly described with respect to the lamp 1a. The lamp 1a includes a light source 41, a heat sink 42, and a projection lens 43.

The light source 41 emits light for lighting which is irradiated to the front, and is provided in the heat sink 42. In the embodiment, the number of light source 41 is one. However, in addition to the light source 41, one or two or more other light sources may be provided in the heat sink 42. Other light sources may include, for example, a light source that emits light for daytime running lamp DRL or a light source that emit light for detecting, for example, pedestrians or obstacles. The light source 41 is connected to a controller (not illustrated), and is turned on or turned off based on a control signal given from the controller. When the light source 41 is turned on based on the control signal, the light source 41 emits light for lighting. The light source 41 of the embodiment is provided in the heat sink 42 to irradiate light toward the front of the vehicle.

The heat sink 42 includes a metallic base plate 42A. A plurality of heat radiating fins 42B are integrally provided on one surface side of the base plate 42A and a support frame 42C is fixed on the other surface side of the base plate 42A. The light source 41 is fixed to the surface side of the base plate 42A opposite to the side on which the heat radiating fins 4B are provided. The heat radiating fins 42B extends along a front-rear direction of the vehicle. The front end of the heat radiating fins 42B is connected to the base plate 42A, and the rear end thereof is an open end. At least some of rear ends of the plurality of heat radiating fins 42B face the blower 50. In the embodiment, as illustrated in FIG. 2, in the lamp 1b that is positioned most rearward of the vehicle 100 among the plurality of lamps 1a to 1c, some of the heat radiating fins 42B in the heat sink 42 is positioned behind the front surface of the blower 50. The front surface of the blower 50 is a surface of the blower 50 that is closest to the lamp 1a and in parallel with the left-right direction of the vehicle 100.

Further, brackets 31 are joined to the base plate 42A. A plurality of adjustment screws 32 for aiming adjustment are screwed to the brackets 31, and are supported by the lamp housing 10. For convenience, the brackets 31 and the adjustment screws 32 are omitted in FIG. 2. A head portion 32A which is the other end of the adjustment screw 32 is exposed to the outside of the lamp room LR. By rotating the head portion 32A, the brackets 31 are screwed and tilted, and it is possible to adjust the aiming of the lamp 1a in the vertical and horizontal directions.

The projection lens 43 is an aspherical plano-convex lens, and is fixed to the base plate 42A by the support frame 42C. In the projection lens 43, an incident surface 43A, which is a surface on the side where the light emitted to the front from the light source is incident, is a plane surface, and an emitting surface 43B, which is a surface on the side where the light is emitted, is a convex surface that bulges in the emitting direction. That is, a projector ellipsoid system (PES) optical system is adopted in the lamp 1a of the embodiment.

Figure 4:
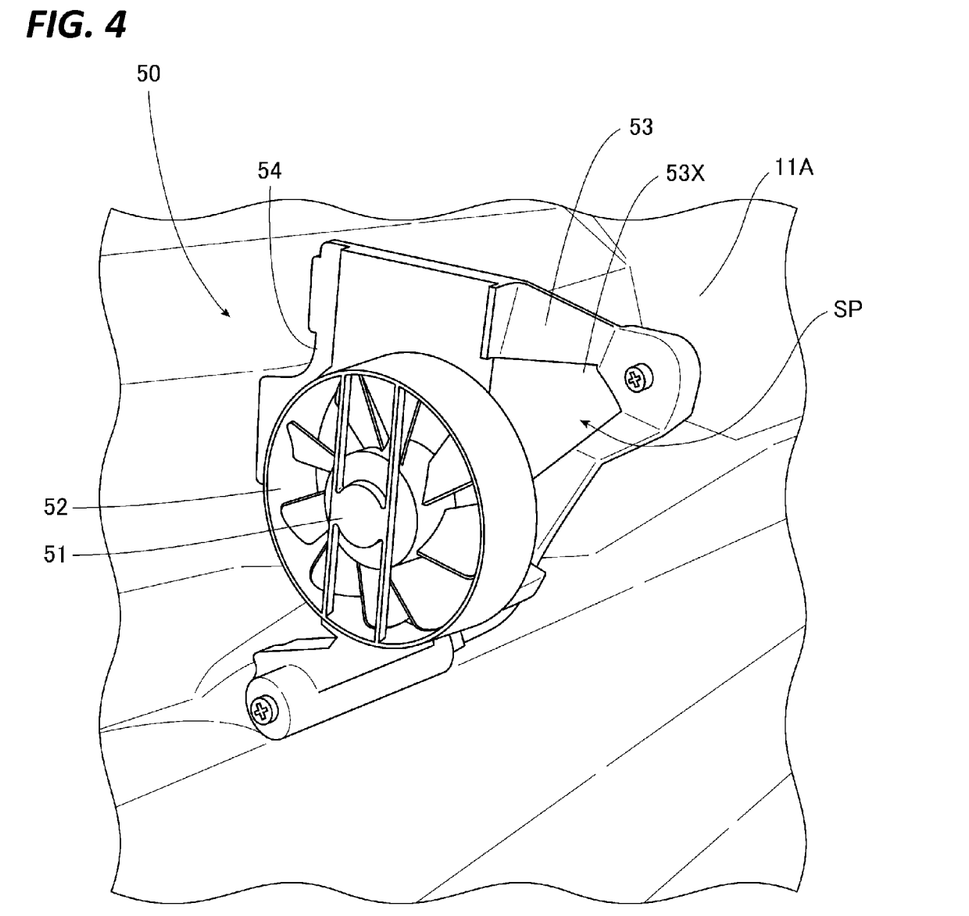
FIG. 4 is a view illustrating a blower fixed to a housing body.

The blower 50 is a machine which sends out air. FIG. 4 is a view illustrating a blower 50 fixed to a housing body 11. As illustrated in FIG. 4, the blower 50 of the embodiment is a propeller type, and includes an impeller 51, a support frame 52, a leg portion 53, and a rectifying portion 54.

The impeller 51 is provided with a plurality of wings around a rotation axis at a predetermined interval. The impeller 51 is connected to a controller (not illustrated), and is rotated based on a control signal given from the controller. The controller in the embodiment has an air suction mode and exhaust mode. In the air suction mode, a control signal of the suction mode is given to the impeller 51, and in the exhaust mode, a control signal of the exhaust mode is given to the impeller 51. When receiving the control signal of the air suction mode, the impeller 51 rotates in a forward direction and blows air to the front of the vehicle 100. Further, when receiving the control signal of the exhaust mode, the impeller 51 rotates in a reversed direction to the forward direction and blows air to the rear of the vehicle 100. The controller to which the impeller 51 is connected may be the same as or different from the controller to which the light source 41 is connected as described above.

The support frame 52 supports the impeller 51. The support frame 52 of the embodiment has an annular shape, and the rotation axis of the impeller 51 disposed inside the support frame 52 is supported pivotably by the support frame 52.

The leg portion 53 fixes the support frame 52 in the front of the rear wall of the housing body 11 with a gap between the rear wall of the housing body 11 and the support frame 52. A space is formed between the rear wall of the housing body 11 and the support frame 52 by the leg portion 53, and the space serves as an air suction space SP of the impeller 51 supported by the support frame 52. Therefore, it may be understood that the air suction space is formed by the leg portion 53 and the rear wall of the housing body 11. The leg portion 53 of the embodiment is disposed so as to surround a part of the periphery of the rear side of the support frame 52. A front side of the leg portion 53 is connected to the support frame 52, and a rear side of the leg portion 53 is fixed to the rear wall of the housing body by screws. Further, an opening 53X is provided in a part of the leg portion 53 that surrounds a part of the periphery of the rear side of the support frame 52. The air suction space SP communicates with the lamp room LP outside the leg portion 53 with a space by the opening 53X. The opening 53X is on a side of the blower 50, and positioned behind the impeller 51.

The rectifying portion 54 guides the air introduced into the air suction space SP in the blowing direction. The rectifying portion 54 of the embodiment is disposed on a side opposite to the opening 53X of the leg portion 53 with respect to the rotation axis of the impeller 51. Further, the rectifying portion 54 of the embodiment is integrally formed with the leg portion 53, and also serves as a part of the leg portion 53 that stationary positions the support frame 52 in the front of the rear wall.

Next, a flow of air blown by the blower 50 will be described.

Figure 5:
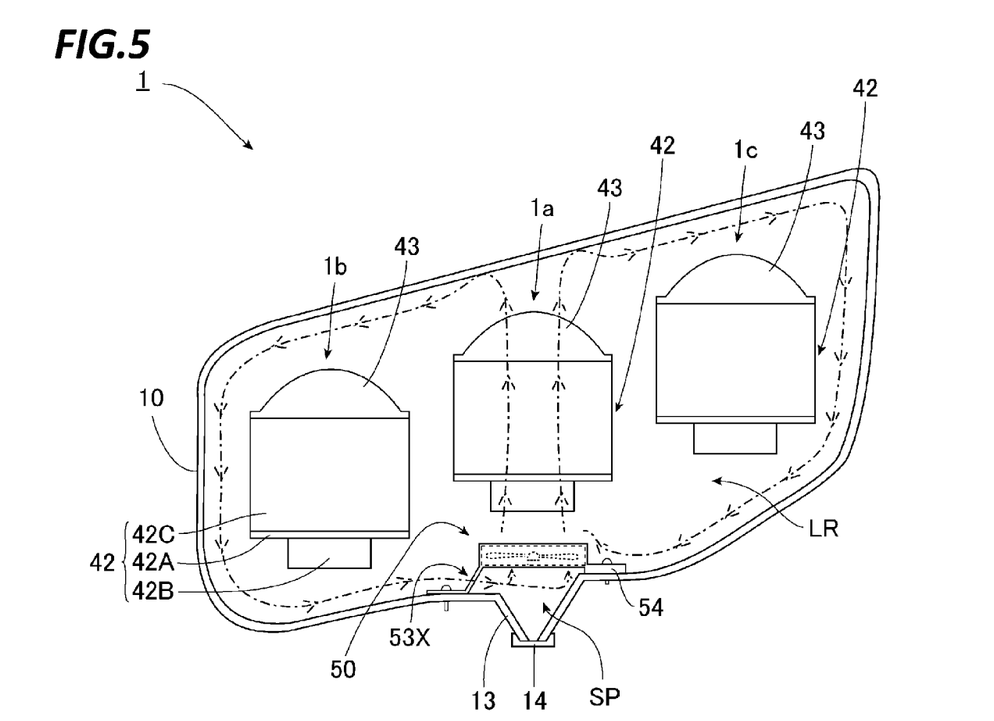
FIG. 5 is a conceptual view illustrating a state of air flowing in a lamp housing in an air suction mode.

In the air suction mode, the blower 50 rotates the impeller 51 in the forward direction based on the control of the controller when the light source 41 is turned on. However, except when the light source 41 is turned on, the blower 50 may rotate the impeller 51 in the forward direction. FIG. 5 is a conceptual view illustrating a state of air flowing in the lamp housing 10 in the air suction mode. The flow of air is indicated by a one-dot chain line in FIG. 5.

As illustrated in FIG. 5, air in the rear side of the impeller 51 is blown to the front by the forward rotation of the impeller 51 in the blower 50, and flows to the lamp 1a disposed in the blowing direction. In the lamp 1a, heat generated from the light source 41 by turning on the light source 41 is transmitted to the heat radiating plate 42B, and the heat is cooled down by air flowing to the lamp 1a.

Further, at least a part of air flowing to the lamp 1a flows to the front of the vehicle 100 via the lamp 1a, reaches the front cover 12 of the lamp housing 10, and flows along an inner wall of the lamp housing.

The air which flows to the left side of the vehicle 100 along the inner wall of the lamp housing 10 is directed to the lamp 1b. In the lamp 1b, heat generated from the light source 41 by turning on the light source 41 is transmitted to the heat radiating plate 2B, and the heat is cooled down by air flowing to the lamp 1b. At least a part of the air which flows to the lamp 1b is directed to the blower 50 via the lamp 1b. As described above, in the blower 50, a negative pressure is generated in the air suction space SP behind the impeller 51 by the forward rotation of the impeller 51. The air directed to the blower 50 is sucked into the air suction space SP from the opening 53X formed in the leg portion 53 of the blower 50 by the negative pressure. The air sucked into the air suction space SP is guided to the impeller 51 of the blower 50 by the rectifying portion 54, is blown again to the front of the vehicle 100 by the forward rotation of the impeller 51, and circulates in the lamp housing 10. As described above, the breathing hole BH is provided at a position behind the blower 50 in the housing body 11. Therefore, outside air is sucked into the air suction space SP from the breathing hole BH by the negative pressure generated in the air suction space SP, and circulates in the lamp housing 10 as described above. As a result, in the embodiment, the air in the lamp housing 10 which is warmed by the heat generated from the light source 51 is cooled down by outside air.

As described above, the plurality of lamps 1a to 1c of the embodiment includes the first lamp 1a disposed in the blowing direction where air is blown by the blower 50 and the second lamp 1b disposed on a flow path of the air flowing via the first lamp 1a. Further, the blower 50 is configured to suck the air flowing via the second lamp 1b from the air suction space SP.

Further, the air which flows to the right side of the vehicle 100 along the inner wall of the lamp housing 10 is directed to the lamp 1c. In the lamp 1c, heat generated from the light source 41 by turning on the light source 41 is transmitted to the heat radiating plate 42B, and the heat is cooled down by air flowing to the lamp 1c. At least a part of the air which flows to the lamp 1c is directed to an outer wall surface of the rectifying portion 54 of the blower 50 via the lamp 1c. At least a part of the air which reaches the outer wall surface of the rectifying portion 54 is guided to the front of the impeller 51 in the blower 50, and circulates in the lamp housing 10.

As described above, the rectifying portion 54 of the embodiment is configured to guide the air introduced into the air suction space SP in the blowing direction from the rear side of the impeller 51 by an inner wall surface of the rectifying portion 54, and guide the air flowing to the outer wall surface of the rectifying portion 54 in the blowing direction from the side of the impeller 51 by the outer wall surface.

Figure 6:
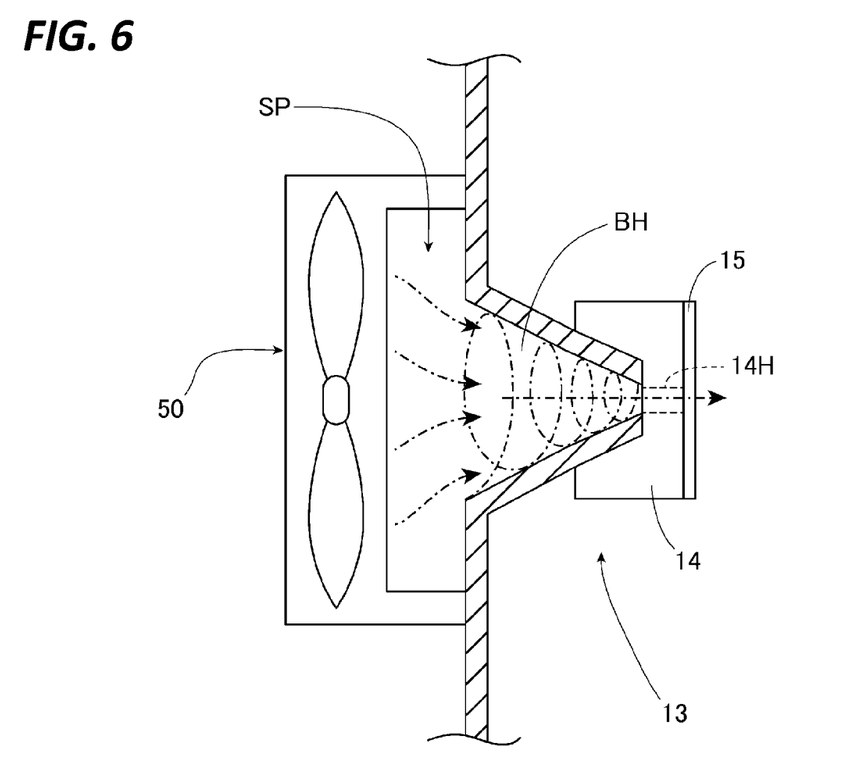
FIG. 6 is a conceptual view illustrating a state of air flowing in a lamp housing in an exhaust mode.

Meanwhile, in the exhaust mode, the blower 50 rotates the impeller 51 in a reversed direction to the forward direction based on the control of the controller when the light source 41 is turned off. However, except when the light source 41 is turned off, the blower 50 may rotate the impeller 51 in the reversed direction to the forward direction. FIG. 6 is a conceptual view illustrating a state of air flowing in a lamp housing 10 in an exhaust mode. The flow of air is indicated by a one-dot chain line in FIG. 6.

As illustrated in FIG. 6, air in the front side of the impeller 51 is blown to the rear by rotation in the reversed direction to the forward direction of the impeller 51 in the blower 50, and the air in the lamp housing 10 is exhausted to the outside through the breathing hole BH of the breathing portion provided in the rear of the blower 50. As described above, a cross-sectional area of the breathing hole BH decreases from the opening of the lamp room LR side toward the rear. Therefore, the air introduced from the opening of the lamp room LR side tends to turn and flow toward the rear, so that negative pressure easily occurs in the center of the turn. As a result, it is promoted to discharge the air introduced into the breathing hole BH from the opening on the lamp room LR side to the outside.

As described above, in the vehicle head lamp 1 of the embodiment, the plurality of lamps 1a to 1c including the light source 41 that emits light irradiated to the front, and the heat sink 42 that radiates the heat generated from the light source 41 are parallel to each other. The lamps 1a to 1c and the blower 50 are accommodated in the lamp housing 10.

As described above, the plurality of lamps 1a to 1c of the embodiment includes the first lamp 1a disposed in the blowing direction where air is blown by the blower 50 and the second lamp 1b disposed on a flow path of the air flowing via the first lamp 1a. The blower 50 includes the air suction space SP that sucks the air flowing via the second lamp 1b.

In the vehicle head lamp 1, the air blown to the first lamp 1a by the blower 50 flows to the second lamp 1b via the first lamp 1a, and is directed to the second lamp 1b. The air passing through the second lamp 1b is sucked from the air suction space SP of the blower 50, and is blown again to the first lamp 1a. In this manner, according to the vehicle head lamp 1 of the embodiment, it is possible to circulate air in the lamp housing 10 with one blower 50, and it is possible to suppress uneven heat distribution in the lamp housing 10 by the circulation of the air. In this way, according to the vehicle head lamp 1, it is possible to suppress uneven heat distribution while miniaturizing.

Further, in the embodiment, the blower 50 includes the rectifying portion 54 that guides the air introduced into the air suction space SP in the blowing direction. Therefore, circulation of the air inside the lamp housing 10 may be promoted as compared with a case where the air introduced into the air suction space SP is not guided in the blowing direction. Therefore, the uneven heat distribution in the lamp housing 10 may be further suppressed.

Further, in the embodiment, the lamp housing 10 includes the housing body 11 that is provided with the opening 11X in the front, and the front cover 12 that is attached to the housing body 11 so as to close the opening 11X. The blower 50 is fixed to the housing body 11.

The lamp 1a includes an adjustment screw 32 as a mechanism for adjusting an aiming of light emitted from the light source 41. However, when the blower 50 is fixed to the lamp 1a, the wind direction of the blower 50 may be changed due to adjustment of the aiming. With regard to this, when the blower 50 is fixed to the housing body 11 as in the embodiment, a relative position between the lamp housing 10 and the blower 50 is constant. Therefore, irrespective of whether the lamp 1a includes the adjustment screw 32, the blowing direction of the blower 50 is constant, so that circulation of the air in the lamp housing 10 may be kept constantly.

Further, in the embodiment, the blower 50 includes the impeller 51, the support frame 52 that supports the impeller 51, and the leg portion 53 that is fixed to the housing body 11 and is connected to the support frame 52. The air suction space SP is formed by the leg portion 53 and the housing body 11. Therefore, even when the shape of the housing body 11 is changed, it is easy to fix the blower 50 to the housing body 11 while forming the air suction space SP, so that versatility may be improved.

Further, in the embodiment, the breathing hole BH is provided in the housing body in the rear of the blower 50. Therefore, outside air is sucked into the lamp housing 10 from the breathing hole BH by the blower 50, and the outside air may be circulated in the lamp housing 10. Therefore, the cooling effect inside the lamp housing 10 may be enhanced as compared with a case where only the air inside the lamp housing 10 is circulated in the lamp housing 10.

Further, in the embodiment, a part of the heat radiating fins 42B of the heat sink 42 in the second lamp 1b is positioned behind the front surface of the blower 50. Therefore, the second lamp 1b is close to the blower 50 as compared with the case where a part of the heat sink in the second lamp 1b is positioned at the front of the front surface of the blower 50. Therefore, the blower 50 may suck more air flowing via the second lamp 1b, from the air suction space SP. Accordingly, circulation of air inside the lamp housing 10 may be promoted.

In the above, the present disclosure has been described with reference to embodiments, but the present disclosure is not limited thereto.

For example, in the above embodiment, the vehicle head lamp includes the first lamp 1a that is disposed in the blowing direction of the blower 50, the second lamp 1b that is disposed on the flow path of the air flowing via the first lamp 1a, and the third lamp 1c that is disposed at a side opposite to the side on which the second lamp 1b is disposed with respect to the first lamp 1a, but the third lamp 1c may be omitted. Further, in addition to the three lamps 1a to 1c, other lamps may be provided. Further, in the above embodiment, although the lamps 1a to 1c are arranged diagonally along the left-right direction, arranging methods of the plurality of lamps are not limited thereto. The plurality of lamps may be arranged in the vertical direction, may be parallel in the left-right direction, and may be arranged in a U shape. Briefly, the vehicle head lamp may include at least the first lamp 1a disposed in the blowing direction of the blower 50 and the second lamp 1b disposed on a flow path of the air flowing via the first lamp 1a.

Further, in the above embodiment, each of the plurality of lamps 1a to 1c are configured to include the light source 41 and the heat sink 42, but in addition to the light source 41 and the heat sink 42, other members, for example, reflectors may be included. Further, the projection lens 43 is not a necessary component. For example, instead of the PES-type lamps 1a to 1c of the above embodiment, a direct-emitting type lamp, or a parabola type lamp, or the like may be applied. Although the heat radiating fins 42B of the heat sink 42 in the embodiment extends in the front-rear direction of the vehicle 100, the heat radiating fins 42B of the heat sink 42 may extend in the vertical direction, may extend obliquely, or may extend in directions other than these directions.

Further, in the above embodiment, the blower 50 is fixed to the housing body 11, but, the blower 50 may be fixed to the lamp 1a. However, when the relative position between the lamp housing 10 and the blower 50 is constant as described above, the blower 50 may be fixed to the housing body 11.

Figure 7:
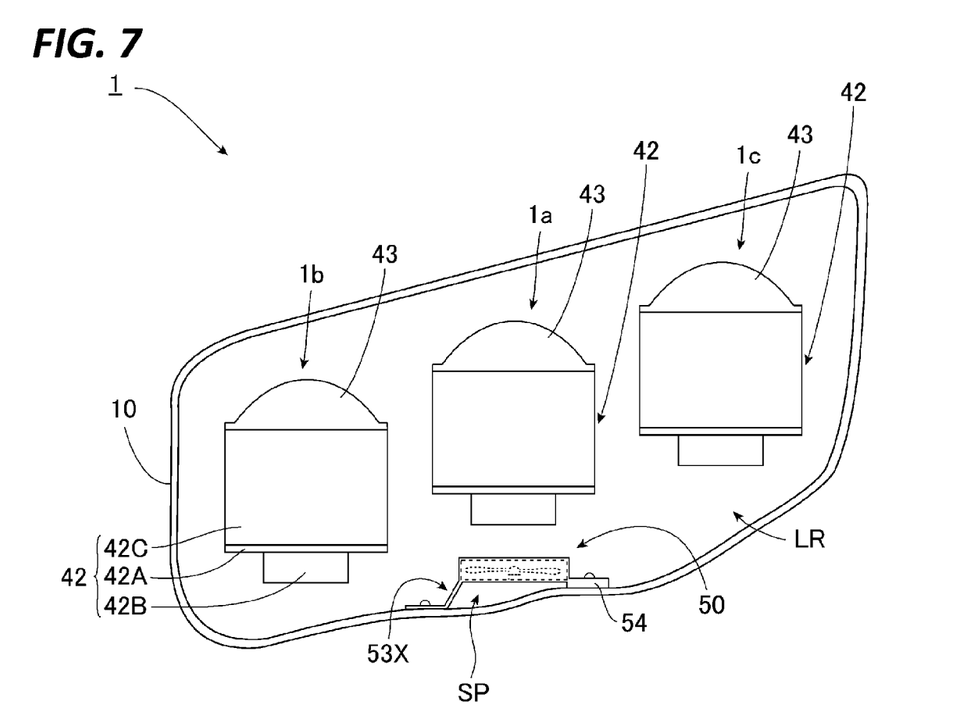
FIG. 7 is a view illustrating a vehicle head lamp according to a modification of the present disclosure similarly to FIG. 2.

Further, in the above embodiment, the breathing hole BH is provided at a rear position of the blower 50 in the housing body, but the breathing hole may be provided at a position other than the rear of the blower 50, and may be omitted. FIG. 7 is a view illustrating a vehicle head lamp according to a modification of the present disclosure similarly to FIG. 2. A vehicle head lamp 1 according to the modification is different from the vehicle head lamp 1 according to the embodiment in that the breathing hole BH and the cap 14 are not provided, and the surface on the lamp room LR side of the blower 50 in the housing body 11 is a smooth surface. In this case, only the air in the lamp housing 10 circulates in the lamp housing 10. The breathing hole may be provided a position different from the rear position of the blower 50 in the housing body 11 in the modification. With such a configuration, the pressure difference between the inside of the lamp room LR and the outside of the lamp room LR may be alleviated by the breathing hole. The breathing hole may be covered with a coating film which is gas permeable and waterproof like the through hole 14H of the cap 14 of the above embodiment. However, in the case where outside air is sucked into the lamp housing 10 from the breathing hole BH by the blower 50 so as to enhance the cooling effect in the lamp housing 10 as described above, the breathing hole BH may be provided in the rear position of the blower 50 in the housing body 11.

Further, in the embodiment, the blower 50 is configured as a propeller type including the impeller 51, the support frame 52, the leg portion 53, and the rectifying portion 54. However, the blower may be configured as a sirocco type, or may adopt a configuration other than the propeller type or the sirocco type. The rectifying portion 54 may be omitted. Further, in the embodiment, a shaft portion of the screw for fixing the rear side of the leg portion to the rear wall of the housing body 11 penetrates the housing body 11. However, the shaft of the screw may not penetrate the housing body 11 as illustrated in FIG. 7. In this case, a through hole may not be provided in the housing body 11. Thus, it is possible to prevent water from entering into the lamp room LR through a gap between a screw and the housing body 11. Further, the leg portion 53 may be fixed to the housing body 11 by other than a screw, for example, by a clamp, or the like.

Further, in the embodiment, a part of the heat sink 42 in the second lamp 1b is positioned behind the front surface of the blower. However, the whole heat sink 42 may be positioned at the front of the front surface of the blower 50. Meanwhile, in a case where the blower 50 sucks more air flowing via the second lamp 1b, from the air suction space SP, a part of the heat sink 42 in the second lamp 1b may be positioned behind the front surface of the blower 50.

According to the present disclosure, there is provided a vehicle head lamp capable of suppressing uneven heat distribution while miniaturizing, and the vehicle head lamp according to the present disclosure may be used in the field of a vehicle head lamp, for example, an automobile head lamp.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A vehicle head lamp comprising:
   a plurality of lamps arranged in parallel with each other and each including a light source that emits light irradiated to a forward and a heat sink that radiates heat generated from the light source;
   a blower; and
   a lamp housing configured to accommodate the plurality of lamps and the blower,
   wherein each of the plurality of lamps includes a first lamp disposed in a blowing direction where air is blown by the blower, and a second lamp disposed on a flow path of the air flowing through the first lamp, and
   the blower includes an air suction space into which the air flowing through the second lamp is sucked.

2. The vehicle head lamp of claim 1, wherein the blower includes a rectifying unit configured to guide air flowing into the air suction space in the blowing direction.

3. The vehicle head lamp of claim 2, wherein the lamp housing includes a housing body having an opening in front, and a front cover attached to the housing body so as to close the opening, and the blower is fixed to the housing body.

4. The vehicle head lamp of claim 3, wherein the blower includes an impeller, a support frame configured to support the impeller, and a leg portion fixed to the housing body and connected to the support frame, and the air suction space is formed by the leg portion and the housing body.

5. The vehicle head lamp of claim 3, wherein a breathing hole is provided at a rear position of the blower in the housing body.

6. The vehicle head lamp of claim 1, wherein a part of the heat sink of the second lamp is positioned behind a surface of the blower that is closest to the first lamp and in parallel with a left-right direction of a vehicle.

7. The vehicle head lamp of claim 2, wherein a part of the heat sink of the second lamp is positioned behind a surface of the blower that is closest to the first lamp and in parallel with a left-right direction of a vehicle.

8. The vehicle head lamp of claim 3, wherein a part of the heat sink of the second lamp is positioned behind a surface of the blower that is closest to the first lamp and in parallel in a left-right direction of a vehicle.

9. The vehicle head lamp of claim 4, wherein a part of the heat sink of the second lamp is positioned behind a surface of the blower that is closest to the first lamp and in parallel in a left-right direction of a vehicle.

10. The vehicle head lamp of claim 5, wherein a part of the heat sink of the second lamp is positioned behind a surface of the blower that is closest to the first lamp and in parallel in a left-right direction of a vehicle.

* * * * *